United States Patent
Barnett

(10) Patent No.: US 6,892,603 B2
(45) Date of Patent: May 17, 2005

(54) ROTATABLE CONTROL LEVER MOUNT

(75) Inventor: Robert L. Barnett, 2090 Meyer Pl., Costa Mesa, CA (US) 92627

(73) Assignee: Robert L. Barnett, Costa Mesa, CA (US)

(*) Notice: Subject to any disclaimer, the term of this patent is extended or adjusted under 35 U.S.C. 154(b) by 92 days.

(21) Appl. No.: 10/138,933

(22) Filed: May 3, 2002

(65) Prior Publication Data

US 2003/0205102 A1 Nov. 6, 2003

(51) Int. Cl.[7] .............................................. F16C 1/10
(52) U.S. Cl. ................................. 74/502.2; 403/281
(58) Field of Search .................... 384/541; 74/502.2, 74/501.6, 511 R; 403/279, 281, 373, 374.1, 374.2, 374.3

(56) References Cited

U.S. PATENT DOCUMENTS

| | | | |
|---|---|---|---|
| RE15,187 E | * 8/1921 | Reynolds | ..................... 384/539 |
| 2,874,587 A | 2/1959 | Schmid | |
| 3,336,048 A | * 8/1967 | Papucki | ..................... 74/551.8 |
| 3,561,281 A | 2/1971 | Wilfert | |
| 3,645,151 A | 2/1972 | Yoshikawa | |
| 3,802,200 A | * 4/1974 | Kolm | ......................... 60/594 |
| 4,378,819 A | 4/1983 | Macho | |
| 4,391,160 A | 7/1983 | Myers | |
| 4,726,252 A | 2/1988 | Dawson | |
| 4,730,509 A | * 3/1988 | Hornady | ..................... 74/501.6 |
| 4,899,610 A | * 2/1990 | Bourret | ......................... 74/489 |
| 5,096,327 A | * 3/1992 | Ruland | ......................... 403/290 |
| 5,481,934 A | * 1/1996 | Tagawa | .................... 74/473.14 |
| 5,575,178 A | 11/1996 | Wu | |
| 5,584,210 A | 12/1996 | Gelbein | |
| 5,598,744 A | * 2/1997 | Chen | .......................... 74/551.1 |
| 5,732,598 A | * 3/1998 | Shoge et al. | .............. 74/473.13 |
| 6,393,933 B2 | * 5/2002 | Shirayanagi | .................. 74/489 |

FOREIGN PATENT DOCUMENTS

| | | |
|---|---|---|
| EP | 0 585 474 A | 3/1994 |
| EP | 0 628 475 A | 12/1994 |
| EP | 0 683 092 A | 11/1995 |

* cited by examiner

*Primary Examiner*—David A. Pucci
*Assistant Examiner*—Vicky A. Johnson
(74) *Attorney, Agent, or Firm*—Knobbe Martens Olson & Bear LLP

(57) ABSTRACT

A control lever mount assembly suitable for use in connection with an off-road motorcycle. The lever mount assembly includes a lever-supporting portion, or perch, which is configured to rotatably support a control lever. A sleeve is secured to the handlebar and supports the perch for rotation about an axis of the handlebar. A detent assembly secures the perch in a desired angular orientation relative to the sleeve and the handlebar. The detent assembly is configured to permit rotation of the perch in response to a force being imparted to the lever and/or perch during a crash or fall to protect the perch and lever from damage. Preferably, one or more clamp members are configured to apply a clamping force to the sleeve over a relatively large surface area to prevent damage to the handlebar. A slot may be provided in the sleeve to permit the sleeve to be compressed around the handlebar for a secure fit.

27 Claims, 5 Drawing Sheets

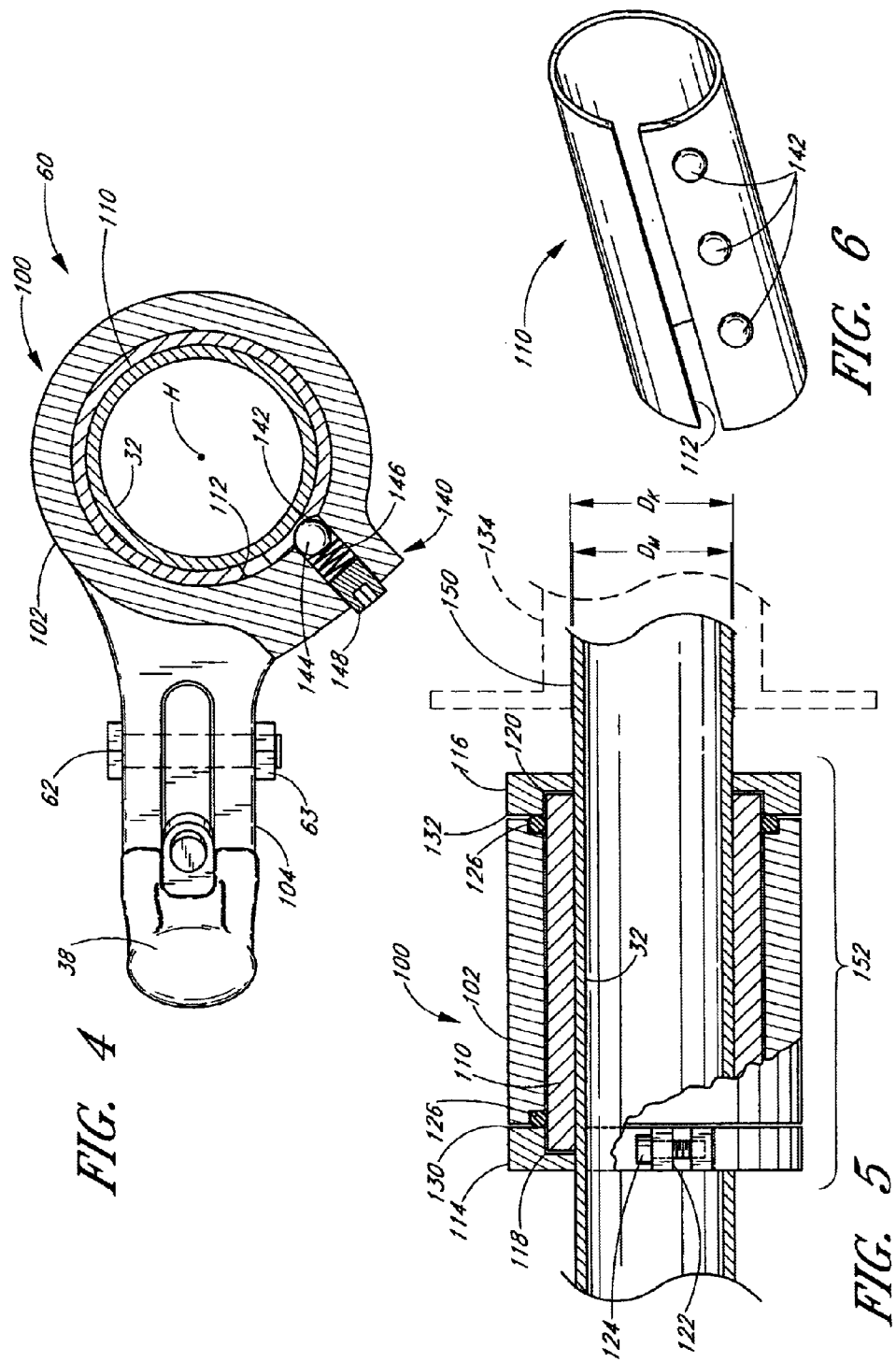

ROTATABLE CONTROL LEVER MOUNT

BACKGROUND OF THE INVENTION

1. Field of the Invention

The present invention relates generally to control lever assemblies for operating a control system of a vehicle. More specifically, the present invention relates to a rotatable control lever mount to inhibit breakage of the control lever, especially suited for use with a front brake or a manual clutch system of an off-road motorcycle.

2. Description of the Related Art

Motorcycle control levers are commonly mounted to the motorcycle's handlebar to permit a rider to operate a control system of the motorcycle, such as a manual clutch system or a front brake system. Typically, the control lever is rotatably supported by a lever mount, which is clamped to the handlebar on an inward side of a handgrip. The control lever rotates about a pivot axis to impart a pulling force on a bowden wire arrangement (or impart a pushing force on a hydraulic piston, if the control system is hydraulically actuated) and thereby operate the control system. Thus, rotational movement of the control lever causes linear movement of the bowden wire (or piston).

One problem with conventional control levers, and control lever mounts, is that they are often subjected to damage in the event of a fall or crash. The outer ends of the handlebar are generally the most outwardly disposed portion of the motorcycle. As a result, the control lever and/or the mount may forcibly strike the ground in a crash or fall causing the lever or the lever mount to break. A manual transmission motorcycle is generally inoperable without a functioning clutch, therefore if the clutch lever or clutch lever mount is broken during a motorcycle race, the rider will most likely be unable to finish the race. Thus, in motorcycle racing in particular, it is critical that the control lever and control lever mount are not damaged in the event of a crash.

A proposed solution to this problem is disclosed in U.S. Pat. No. 4,391,160 to Myers. As illustrated in FIG. 1, the Myers patent discloses a lever mount assembly, generally indicated by the reference numeral 1, wherein a control lever 2 is connected to a lever-supporting portion of the mount, or lever perch 3. The perch is rotatably supported on a sleeve 4, which includes a collar 5 at its outer end. A plurality of set screws 6 are threaded radially through the collar into contact with the handlebar to secure the sleeve with respect to the handlebar. A detent assembly 7 releasably secures the perch 3 and, thus, the control lever 2 in a desired position with respect to the sleeve 4 and handlebar. The detent assembly 7 permits the perch 3 to rotate and/or move axially inward in response to an appropriately directed force, above a predetermined threshold, being applied to the lever 2 and/or perch 3. The collar 5 prevents outward axial movement of the perch 3.

SUMMARY OF THE INVENTION

While offering some protection to the lever 2 and the lever mount assembly 1, the lever mount 1 of the Myers patent is undesirable in that it allows axial movement of the perch 3. When the perch 3 moves axially, it may damage other components mounted on the handlebar, such as an engine stop button, for example.

Additionally, an unreasonable amount of time and force may be necessary to position the perch 3 back onto the sleeve 4 due to the detent arrangement 7, as is described in greater detail below. Particularly in the context of racing events, the time necessary to reposition or "reset" the lever perch 3 onto the sleeve 4 renders the Myers lever mount arrangement 1 undesirable.

Further, the sleeve 4 arrangement of the Myers lever mount 1 is likely to be unstable when mounted on a handlebar. Many handlebars, especially those intended for racing applications, include a knurled end portion where a handgrip is mounted to the handlebar. The knurling creates a high friction surface which prevents the handgrip from undesirably moving or rotating on the handlebar. The knurling also increases the diameter of the knurled portion of the handlebar. The internal diameter of the sleeve 4 of the Myers mount must be large enough to pass over a knurled end portion of a handlebar, which results in the sleeve 4 fitting loosely over the portion of the handlebar inward of the knurled end, i.e., where the sleeve 4 is mounted. Because of the loose fit and because the sleeve 4 is only secured to the handlebar by the set screws 6 at one end (i.e, the collar 5 end), the set screws 6 are likely to act as a fulcrum and may allow the sleeve 4 to pivot about the location of the set screws 6. Furthermore, the pressure applied to the handlebar due to the small area of the set screws 6 may damage relatively thin, aluminum handlebars that are presently preferred in motorcycle racing and may render the Myers lever mount 1 unusable with handlebars constructed from other materials, such as composites, for example. As a result of the above-noted shortcomings, the lever mount 1 of the Myers patent has not been significantly utilized by motorcycle racers.

A common lever mount arrangement presently utilized in motorcycle racing is to position a sleeve, often made of a low-friction polymer material such as TEFLON, between the lever mount and the handlebar. The lever mount is adjusted to relatively loosely clamp the handlebar and sleeve. Thus, if a force is imparted onto the lever or lever mount, the lever mount is permitted to rotate relative to the handlebar to inhibit damage. However, this method also has a number of disadvantages. For example, because the lever mount must be loosely clamped to the handlebar in order to ensure it can move when necessary, the lever mount may move at times when it is undesirable. Also, the frictional force between the lever mount and the sleeve, which tends to inhibit movement of the lever mount, remains constant throughout rotational movement of the lever mount. Accordingly, lever damage may occur if this frictional force is too high. Further, repositioning of the lever is difficult due to such frictional force between the lever mount and the sleeve.

Accordingly, preferred embodiments of the present invention desirably overcome the above-described drawbacks associated with the prior art. Preferred embodiments of the present lever mount assembly permit rotational movement of the lever relative to the handlebar while preventing axial movement thereof. In addition, once the lever is released from its desired rotational position, rotation movement preferably is permitted with relatively little resistance.

A preferred embodiment is a control lever mount for mounting a control lever to a handlebar. The handlebar defines a handlebar axis and an outer end portion comprising a control lever mount location and a hand grip portion. The mount includes a sleeve, an internal surface of the sleeve defining a first diameter. The first diameter is sized such that the sleeve may be positioned around the handlebar at the mount location. The sleeve includes a slot configured to permit the first diameter to be reduced such that the sleeve may be secured to the handlebar. At least one clamp portion secures the sleeve to the handlebar. A body portion has a lever support portion configured to pivotally support a control lever for rotation about a pivot axis. The body portion is supported by the sleeve and is rotatable about the handlebar axis. A detent arrangement is configured to releasably secure the body portion in an angular orientation with respect to the handlebar axis and permits the body portion to move from the angular orientation in response to a moment above a predetermined threshold being applied to the body portion. A first stop portion is arranged to contact the body portion to prevent movement of the body portion along the handlebar axis beyond the first stop in a first direction and a second stop portion is arranged to contact the body portion to prevent movement of the body portion along the handlebar axis beyond the second stop in a second direction opposite the first direction.

A preferred embodiment is a control lever mount for mounting a control lever to a handlebar, the handlebar defining a handlebar axis and an outer end portion of the handlebar comprising a control lever mount location and a hand grip portion. The mount includes a sleeve, an internal surface of the sleeve defining a first diameter sized such that the sleeve may be positioned around the handlebar at the mount location. The sleeve includes a slot, the slot being configured to permit the first diameter to be reduced such that the sleeve may be secured to the handlebar. A first clamp portion and a second clamp portion are configured to secure the sleeve to the handlebar. The first clamp portion is configured to apply a clamping force to substantially the entire circumference of a first end of the sleeve and the second clamp portion is configured to apply a clamping force to substantially the entire circumference of a second end of the sleeve. A body portion has a lever support portion configured to pivotally support a control lever for rotation about a pivot axis. The body portion is supported by the sleeve and is rotatable about the handlebar axis. A detent arrangement is configured to releasably secure the body portion in an angular orientation with respect to the handlebar axis and permit the body portion to move from the angular orientation in response to a moment above a predetermined threshold being applied to the body portion. At least a first stop portion is arranged to contact the body portion to prevent movement of the body portion along the handlebar axis beyond the first stop in a first direction.

A preferred embodiment is a control lever mount for mounting a control lever to a handlebar, the handlebar defining a handlebar axis and an outer end portion of the handlebar comprising a control lever mount location and a hand grip portion. The mount includes a sleeve, an internal surface of the sleeve defining a first diameter sized such that the sleeve may be positioned around the handlebar at the mount location. At least one clamp portion secures the sleeve to the handlebar. A body portion has a lever support portion configured to pivotally support a control lever for rotation about a pivot axis. The body portion is supported by the sleeve and is rotatable about the handlebar axis. A first stop portion is arranged to contact the body portion to prevent movement of the body portion along the handlebar axis beyond the first stop in a first direction and a second stop portion is arranged to contact the body portion to prevent movement of the body portion along the handlebar axis beyond the second stop in a second direction opposite the first direction. The control lever mount includes a first interference surface and a second interference surface, the first interference surface and the second interference surface being configured to contact one another in a first position to provide a first level of resistance to rotation of the body portion about the handlebar axis. The first interference surface and the second interference surface having a second position providing a second level of resistance to rotation of the body portion, the second level of resistance being less than the first level of resistance.

BRIEF DESCRIPTION OF THE DRAWINGS

These and other features, aspects and advantages of the present invention are described below with reference to drawings of preferred embodiments, which are intended to illustrate, and not limit, the present invention. The drawings comprise eight figures.

FIG. 4 is a partial cross-section view of the handlebar and control lever mount of FIG. 3, taken along the line 4—4 of FIG. 3;

FIG. 5 is a partial cross-sectional view of the control lever mount of FIG. 3, taken along the line 5—5 of FIG. 3;

FIG. 6 is a perspective view of a sleeve of the control lever mount of FIG. 3 illustrated separate from the handlebar and remaining components of the control lever mount;

DETAILED DESCRIPTION OF THE PREFERRED EMBODIMENT

The present invention finds utility with a number of vehicles, including, without limitation, motorcycles, bicycles, all terrain vehicles (ATVs) and other types of vehicles where control levers may be employed. In addition, advantages present in preferred embodiments may be realized with a number of different control lever functions, such as for use with a manual clutch or braking system, for example. Illustrated embodiments of the control lever mounts, however, are particularly suited for use with a cable-actuated manual clutch lever of an off-road motorcycle.

Figure 2:
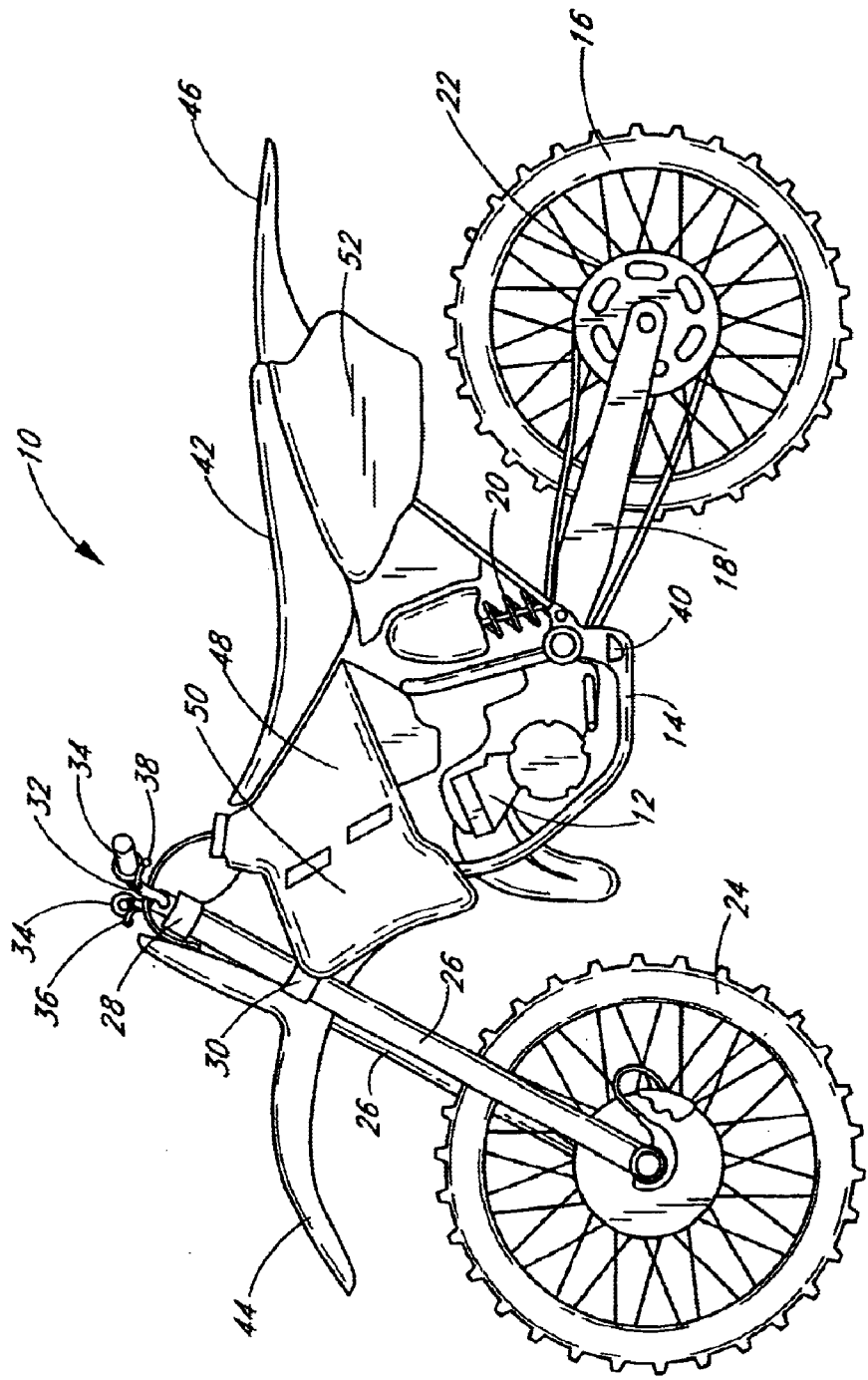
FIG. 2 is a side elevational view of an off-road motorcycle having a preferred control lever mount mounted to a handlebar assembly for actuating a manual clutch of the motorcycle.

With reference to FIG. 2, an off-road motorcycle, generally referred to by the reference numeral 10, is shown. Preferably, an internal combustion engine 12 and associated transmission is mounted within a frame 14 of the motorcycle 10. A rear wheel 16 is connected to the frame through a rear suspension system comprised of a swing arm 18 and a rear shock absorber 20. Preferably, the rear wheel is driven by the engine 12 through a chain and sprocket drive assembly 22. A front wheel 24 is connected to the frame 14 through a front suspension system comprised of telescoping suspension fork 26 and upper and lower fork clamps 28, 30. The fork clamps 28, 30 are connected to a steering stem (not shown) that is journaled for limited rotation about a steering axis defined by a head tube (not shown) of the frame 14, as is known in the art.

A handlebar assembly 32 is preferably connected to the upper fork clamp 28 for steering of the motorcycle 10.

Preferably, each end of the handlebar assembly 32 includes a handgrip 34 for a rider of the motorcycle 10 to grasp. The handlebar assembly 32 provides a location in which to mount a plurality of rider controls, preferably included a twist type throttle assembly (not shown), a brake lever 36, a clutch lever 38, along with other controls as described below. A typical arrangement would place the throttle and brake lever 38 on the right side of the handlebar assembly 32 (from the perspective of a rider seated on the motorcycle) and the clutch lever 38 on the left side of the handlebar assembly 32.

The motorcycle 10 also includes a pair of foot pegs 40, preferably mounted to a lower portion of each side of the frame 14, on which a rider of the motorcycle 10 may place his or her feet. An elongated straddle type seat assembly 42 is provided for use when the rider is in a seated position. A plurality of body portions of the motorcycle 10 are provided, preferably including front and rear fenders 44, 46, a gas tank 48, a pair of radiator shrouds 50 (only one shown) and a pair of side panels 52 (only one shown).

With reference to FIGS. 3–6, a preferred embodiment of a control lever mount 60 is described in detail. As described above, the lever mount 60 is connected to the handlebar assembly 32 and rotatably supports the clutch lever 38 in a position to be accessible to a rider when his or her hand is placed on the handgrip 34. The lever 38 is rotatable about a lever axis $A_L$ to actuate a manual clutch (not shown) of the motorcycle 10. The control lever mount 60 is rotatable about an axis H of the handlebar 32 to inhibit damage of the clutch lever 38 and/or the clutch lever mount 60.

In the illustrated embodiment, a bolt 62 includes a shaft portion (not shown) which extends through both the lever mount 60 and the lever 38 and defines the pivot axis $A_L$. A nut 63 (FIG. 4) preferably is threaded to a lower end of the bolt 62 to secure it in place.

As is known in the art, the lever 38 includes an aperture 64, which receives a cylindrical cable end portion, or barrel 66, of a bowden wire assembly 68. The cable end 66 is attached to a cable 70, which is moveable relative to a sheath, or cable housing 72. The end of the cable 70 opposite the barrel 66 preferably is attached to the manual clutch system (not shown) of the motorcycle 10, as is well known in the art.

The lever mount 60 may include an adjustment mechanism 74 to adjust the tension on the cable 70. The adjustment mechanism 74 preferably is threadably engaged with the lever mount 60 such that rotation of the adjustment mechanism 74 into or out of the lever mount 60 to effectively adjust the length of the cable housing 72 and thereby adjust the tension on the cable 70.

The lever 38 includes an abutting portion 76, which abuts a stop portion 78 of the lever mount 60 to define a relaxed position of the lever 38. The lever 38 is moveable from the relaxed position, toward the handlebar 32, to an actuated position, as indicated by the arrow A in FIG. 3. Rotation of the clutch lever 38 toward the actuated position exerts a pulling force on the cable 70 relative to the cable housing 72, which disengages the manual clutch (not shown), as is well known in the art.

The illustrated lever 38 is a two-piece collapsible assembly designed to deflect in order to resist breakage during a crash or fall. The lever 38 includes an intermediate section 80, which is coupled to the lever mount 60, and a finger grip portion 82, which is rotatably connected to the intermediate section 80. However, the present invention may also be employed with a conventional, one-piece lever.

The finger grip portion 82 abuts the intermediate section 80 such that movement of the finger grip portion 82 toward the handlebar 32 causes rotation of the intermediate section 80 about the pivot axis $A_L$, which exerts a pulling force on the bowden wire arrangement 68, as described above. Specifically, an adjustment screw 84 preferably is held by the finger grip portion 82 and abuts the intermediate section 80. The adjustment screw 84 may also be rotated relative to the finger grip portion 82 to adjust the reach of the lever 38, i.e., the distance of the finger grip portion 82 from the handlebar 32. A nut 86 is provided to retain the adjustment screw 84 in a desired position.

Figure 3:
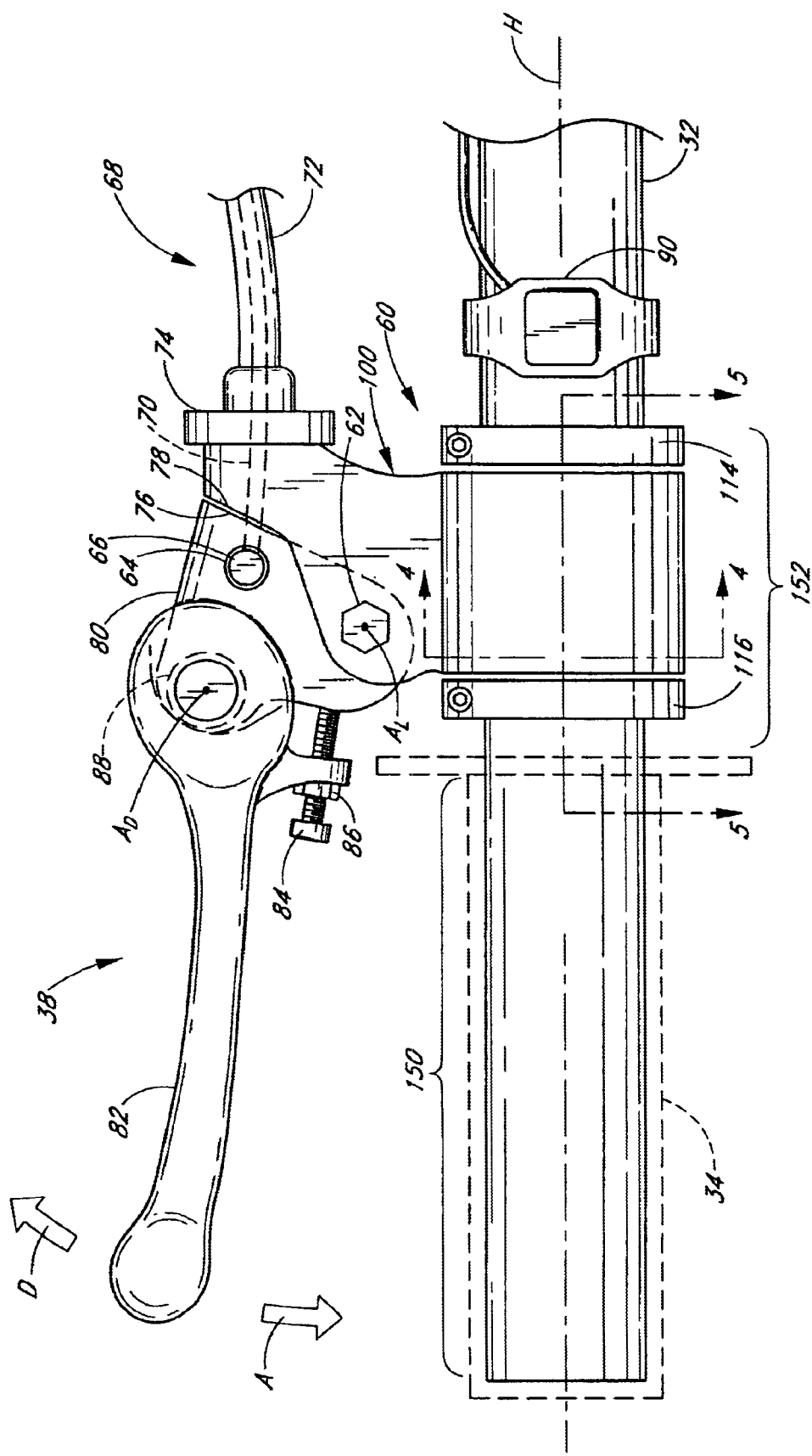
FIG. 3 is a top plan view of a left side of the handlebar assembly of FIG. 2, illustrating the preferred control lever mount supporting a control lever in a position forward of a handgrip mounted on the handlebar.

The finger grip portion 82 is moveable about a deflection axis $A_D$ from a relaxed position relative to the intermediate section 80, as illustrated in FIG. 3, to a deflected position, as indicated by the arrow D of FIG. 3. A biasing member, or torsion spring 88, biases the finger grip portion 82 into its relaxed position. Thus, the finger grip portion 82 is moveable toward its deflected position against the biasing force of the spring 88. An exemplary embodiment of a collapsible lever is described in greater detail in Applicant's U.S. patent application Ser. No. 09/716,539, filed Nov. 20, 2000, which is incorporated by reference herein.

As described above, the lever mount 60 is connected to the handlebar 32 at a location inward from the handgrip 34 to support the lever 38 within reach of the rider's hand, which rests on the handgrip 34. Typically, additional motorcycle controls are located inward from the lever mount 60 (i.e., toward the center of the handlebar 32). In the illustrated embodiment, the motorcycle control includes an engine stop button 90, however, other controls may also be positioned inward of the lever mount 60.

Advantageously, a preferred lever mount 60 is rotatable about the handlebar axis H to inhibit damage to the lever mount 60 and/or the lever 38 in the event of a crash. However, desirably axial movement of the lever mount 60 along the handlebar axis is substantially limited in both directions. Such an arrangement inhibits the lever mount 60 from striking the motorcycle controls, such as engine stop button 90, to inhibit damage to such controls during a crash or fall.

A body portion 100 of the lever mount 60 includes a substantially cylindrical portion 102, which is sized to surround the handlebar 32. A lever support portion 104 extends radially outward from the cylindrical portion 102 and supports the lever 38. Desirably, a cylindrical portion 102 and the lever support portion 104 are constructed from a single piece of material. However, the two portions 102, 104 may also be separately formed and connected together, as may be determined by one of skill in the art.

A sleeve 110 is positioned between the body portion 100 of the mount 60 and the handlebar 32 such that the body portion 100 is rotatably supported by the sleeve 110. Desirably, a slot 112 is formed in a sidewall of the sleeve 110. In the illustrated sleeve 110, the slot 112 extends the entire length of the sleeve 110. However, in alternative arrangements, the slot 112 may extend only a portion of the length of the sleeve 110 or may be non-parallel with respect to the center axis of the sleeve 110. The slot 112 permits the sleeve 110 to be reduced in diameter upon being subjected to a clamping force, as is described in greater detail below.

With reference to FIGS. 3 and 5, desirably a pair of clamps, or clamp rings 114, 116, are provided to secure the sleeve 110 to the handlebar 32. Each clamp ring 114, 116 is substantially L-shaped in cross-section to define respective shoulders 118, 120 of the clamp rings 114, 116, which contact the ends of the sleeve 110. Thus, the clamp rings 114, 116 advantageously contact substantially the entire circumference of the sleeve 110 thereby applying a clamp force to the sleeve 110 over a relatively large surface area. Accordingly, the force tending to secure the sleeve 110 relative to the handlebar 32 is applied over a relatively large surface area of the handlebar 32, thereby preventing damage to the handlebar 32.

Preferably, a slot 122 extends radially through the clamp ring 114. A threaded fastener 124 connects the two ends of the clamp ring 114 defined by the slot 122. The fastener 124 may be tightened to move the ends of the clamp member 114 closer together thereby reducing the diameter of the clamp ring 114 (and sleeve 110) and securing the end of the sleeve 110 to the handlebar 32. Although not illustrated, clamp ring 116 preferably is substantially identical to clamp ring 114 and also includes a slot and a threaded fastener assembly for permitting the diameter of the clamp ring 116 to be reduced.

When the clamp rings 114 and 116 are tightened such that the sleeve 110 is secured to the handlebar 32, desirably the edge surfaces of the sleeve 110 defining the slot 112 are at least slightly spaced from one another. That is, the slot 112 has at least a minimum width when sleeve 110 is secured to the handlebar 32. Accordingly, the sleeve 110 may be slid easily onto the handlebar 32 and still be secured in place despite variations in the diameter of the handlebar 32 due to manufacturing tolerances. While the illustrated configuration is preferred, the sleeve 110 may be secured to the handlebar 32 through other suitable arrangements that may be determined by one of skill in the art. For example, in some arrangements a single clamp member may be used.

Desirably, seal members, such as O-rings 126 may be positioned between the clamp rings 114, 116 and each end of the cylindrical portion 102 of the lever mount body 100. The O-rings 126 inhibit dirt or other foreign material from entering into the space between the lever mount body 100 and the sleeve 110 and thereby impeding rotation of the mount body 100 or causing wear of either the body 100 or the sleeve 110. In addition, if a lubricant is provided between the lever mount body 100 and the sleeve 110, the O-rings 126 inhibit the lubricant from escaping.

A first and a second stop surface, or first and second stops 130, 132, are defined by inner end surfaces of the clamp members 114, 116. The stops 130, 132 are arranged to contact end surfaces of the cylindrical portion 102 of the lever mount body 100 to substantially inhibit axial movement thereof in either direction. Thus, the lever mount body 100 is permitted to rotate about the axis H of the handlebar 32 but is prevented from moving substantially along the axis H of the handlebar 32. Although the stops 130, 132 are defined by the clamp rings 114, 116 in the illustrated embodiment, other suitable arrangements of the stops 130, 132 may also be used. For example, the stops 130, 132 may be formed by separate members other than the clamp rings 114, 116.

A detent arrangement 140 desirably is provided between the lever mount body 100 and the sleeve 110. The detent arrangement 140 is operable to releasably secure the lever mount body 100 in a desired angular, or rotational, position with respect to the sleeve 110 and, thus, the handlebar 32. The illustrated detent arrangement 140 comprises one or more detents 142 formed by an outer surface of the sleeve 110. Although the detents 142 of the illustrated embodiment are spherical in shape, other suitable detent shapes may also be used.

A ball 144 defines a projection surface, which engages the detent 142. A portion of the spherical outer surface of the ball 144 contacts a portion of the spherical surface of the sleeve 110, which defines the detent 142, to provide a force tending to resist rotation of the body portion 100 about the handlebar axis H. Preferably, one ball 144 is provided for each detent 142. The ball 144 is biased into engagement with the detent 142 by a biasing member, such as spring 146. Although the illustrated spring 146 is a coil type spring, other suitable biasing members may be used such as an elastomer spring for example. An adjustment member, such as set screw 148, desirably supports the end of the spring 146 opposite the ball 144 and permits adjustment of a preload on the spring 146.

The lever mount body 100 and, thus, the lever 38 are held in a desired angular position relative to the handlebar 32 against the biasing force of the spring 146 biasing the ball 144 into the detent 142. When a force applied to the lever 38 or lever mount body 100 has a moment about the handlebar axis H above a predetermined threshold, the ball 144 is biased out of engagement of the detent 142 against the biasing force of the spring 146. When the ball 144 is biased out of engagement with the detent 142, the outer surface of the ball 144 is no longer in contact with the portion of the surface of the sleeve 110 defining the detent 142. Thus, in this position, the detent arrangement 140 provides less resistance to rotation of the body portion 100 about the handlebar axis H in comparison to when the ball 144 is within the detent 142.

Once the ball 144 is biased out of engagement with the detent 142, the lever mount body 100 to rotate relative to the sleeve 110 and the handlebar 32, with relatively little resistance and, preferably, essentially no resistance from the mount 60 itself. That is, the cable 68 may provide resistance to angular rotation of the body 100 about the axis of the handlebar. However, once the ball 144 is released from the detent 142, the detent arrangement 140 creates no appreciable resistance to angular rotation of the body portion 100. Advantageously, the likelihood of damage to the lever 38 or the lever mount 60 is substantially reduced by permitting rotation of the mount 60 when a substantial impact is imparted on the lever 38 and/or mount 60 during a crash or fall.

The release force of the detent arrangement 140 may be adjusted by the adjustment member 148, which alters the preload on the spring 146. In addition, the release force may be adjusted by selection of the spring constant of the spring 146 and/or the size of the ball 144. Additionally, although three detents 142 are shown, a lesser or greater number of the detents 142 may be provided. Alternatively, other type of detent arrangements 140 or other catch mechanisms for selectively securing the lever mount body 100 relative to the handlebar 32 may also be used, as may be determined by one of skill in the art. For example, the projection surface for engaging the detent 142 may be have other shapes besides spherical and may be formed by a member other than the ball 144 illustrated herein.

As described above, most motorcycle racing oriented handlebars 32 have a knurled end portion 150 to assist in preventing undesired movement or twisting of the hand grip 34 on the handlebar 32. In addition to the knurled handlebar end, the hand grip 34 is commonly glued and safety-wired into place. These measures are taken due to the extreme twisting forces applied by the rider of the off-road motorcycle 10 to the hand grip 34 as the motorcycle 10 traverses rough terrain.

Figure 1:
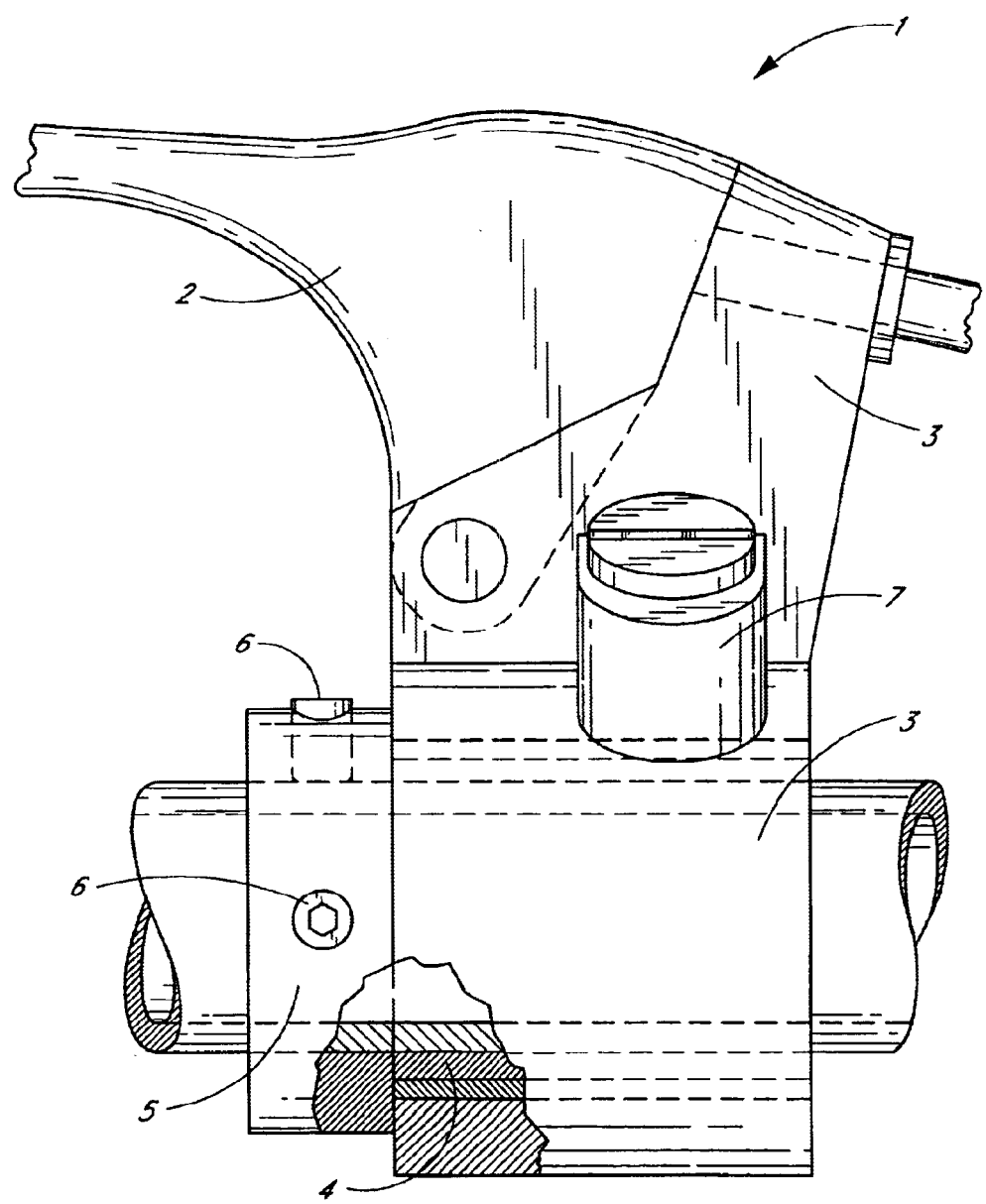
FIG. 1 is a plan view of a prior art lever mount supporting a control lever relative to a motorcycle handlebar.

To create the knurled end portion 150, the outer surface of the handlebar 32 is deformed, which causes the knurled end portion 150 to have a diameter $D_K$ that is larger than the diameter $D_M$ of the lever mount portion 152 of the handlebar 32 adjacent the end portion 150, where the lever mount 60 is connected (FIG. 5). The diameter $D_K$ may be about 0.01 to 0.02 inches larger that the mount diameter $D_M$ on a common racing motorcycle handlebar. As a result, a sleeve having an internal diameter sized to fit with minimal clearance on the diameter of the mounting portion $D_M$ of the handlebar 32 may not be able to slide over the larger diameter $D_K$ of the knurled portion 150. For example, a sleeve having a solid cylindrical wall portion, such as the sleeve 4 disclosed in the Myers patent (FIG. 1), must have an internal diameter larger than the diameter $D_K$ of the knurled portion 150 in order to be assembled onto the handlebar 32. When positioned over the smaller diameter $D_M$ of the lever mount portion 152 of the handlebar 32, such a sleeve 4 will have an undesirable amount of space between the internal surface of the sleeve 4 and the outer surface of the handlebar 32. As a result, the mounting of the sleeve 4 on the handlebar 32 may be unstable. Such a situation is highly undesirable for off-road and/or racing motorcycles where proper functioning and positioning of the motorcycle controls is crucial to the performance of the rider.

The unstable mounting condition due to the gap between such a sleeve 4 and the handlebar 32 is worsened by the single-sided mounting arrangement disclosed in the Myers patent for securing the sleeve 4 relative to the handlebar 32. As described above, the sleeve 4 of the Myers patent includes a collar portion 5 on one end to inhibit outward axial movement of the lever perch 3. A plurality of set screws 6 are threaded radially through the collar portion 5 and into contact with the handlebar 32. The set screws 6 are generally aligned in a plane perpendicular to the handlebar axis H and are tightened against the handlebar 32 to inhibit movement of the sleeve 4. Also as described above, due to the loose fit between the sleeve 4 and the handlebar 32, the set screws 6 are likely to act as a fulcrum and permit pivotal movement of the sleeve 4 about the plane defined by the set screws 6.

Furthermore, due to the set screws 6 having a relatively small diameter, the magnitude of force applied to the handlebar 32 by the set screws 6 that is necessary to prevent movement of the sleeve 4 results in a large pressure being applied to the handlebar 32 by the set screws 6. This large pressure applied to a common thin-walled, alloy racing handlebar 32 by the set screw 6 mounting arrangement of the Myers patent may severely compromise the structural integrity of the handlebar 32.

As mentioned above, another disadvantage of the lever mount 1 disclosed in the Myers patent is that it permits inward axial movement of the perch 3 once the biasing force of the detent arrangement 7 has been overcome. Although not shown in FIG. 1, the detent arrangement 7 of the Myers patent includes a member defining a projection surface, which is carried by the perch 3. A spring biases the projection surface into engagement with a detent on the sleeve 4. Axial movement of the perch 3 may cause damage to the engine stop button 90 (FIG. 3), or other controls that may be located inward of the lever mount 1. Accordingly, axial movement of the perch 3 is highly undesirable.

Additionally, once the perch 3 has moved inward of the sleeve 4, the projection surface of the detent arrangement 7 moves radially inward and into contact with the handlebar 32 due to the biasing force provided by the spring of the detent arrangement 7. As a result, it may be difficult to move the perch 3 back onto the sleeve 4 due to interference between the end surface of the sleeve 4 and the projection surface. In some instances, it may be necessary to insert an elongated tool between the perch 3 and the handlebar 32 in order to pry the projection-surface defining member radially outward a sufficient distance for the perch 3 to be repositioned onto the sleeve 4. Such an arrangement is particularly undesirable in a racing situation where crashes are common and time is critical.

Advantageously, preferred embodiments of the present lever mount 60 overcome the above-described drawbacks of the prior art. For example, the sleeve 110 of the illustrated lever mount 60 desirably is provided with a slot 112, as described above. The provision of a slot 112 permits the sleeve 110 to be stretched about its longitudinal axis to at least slightly increase its inner diameter. The sleeve 110 can then be slid over the knurled portion 150 of the handlebar 32 and released to securely contact the mount portion 152 of the handlebar 32. Thus, the sleeve 110 can be manufactured with an inner diameter very close to the size of the mount diameter $D_M$ of the handlebar 32 and still be slid past the larger diameter $D_K$ of the knurled portion 150. In addition, the slot 112 permits the sleeve 110 to be compressed about its longitudinal axis to at least slightly decrease its inner diameter. This ensures that the sleeve 110 will fit securely about the lever mount portion 152 of the handlebar 32 despite minor variations in the mount diameter $D_M$, due to unavoidable manufacturing tolerances.

Another advantageous feature of the preferred embodiments of the present lever mount assembly 60 is the relatively large surface area of the clamping rings 114, 116, which apply a clamping force to the sleeve 110 to secure the sleeve 110 on the handlebar 32. Preferably, the clamp rings 114, 116 contact an end portion of the outer surface of the sleeve 110 around substantially the entire circumference of the sleeve 110. As a result, the sleeve 110 is securely fastened to the handlebar 32 and the clamping pressure is applied to a relatively large surface area. Accordingly, preferred embodiments of the present lever mount 60 may be safely used with thin-walled, alloy handlebars commonly used on racing motorcycles.

The stops 130, 132 of preferred embodiments of the present lever mount 60 also prevent the body portion, or perch 100, from moving a substantial distance in either axial direction relative to the sleeve 110. Accordingly, damage to the engine stop button 90 (FIG. 3) or other controls positioned inward of the lever mount 60 as a result of being struck by the perch 100 is prevented. Furthermore, to be repositioned into it's desired position for further use, it is only necessary to rotate the perch 100 until the detent arrangement 140 is engaged. Thus, repositioning of the perch 100 may be accomplished relatively quickly and with little effort, making the present lever mount 60 especially suited for use in connection with racing vehicles, such as motorcycles, bicycles, all-terrain vehicles and snowmobiles, for example.

Figure 7:
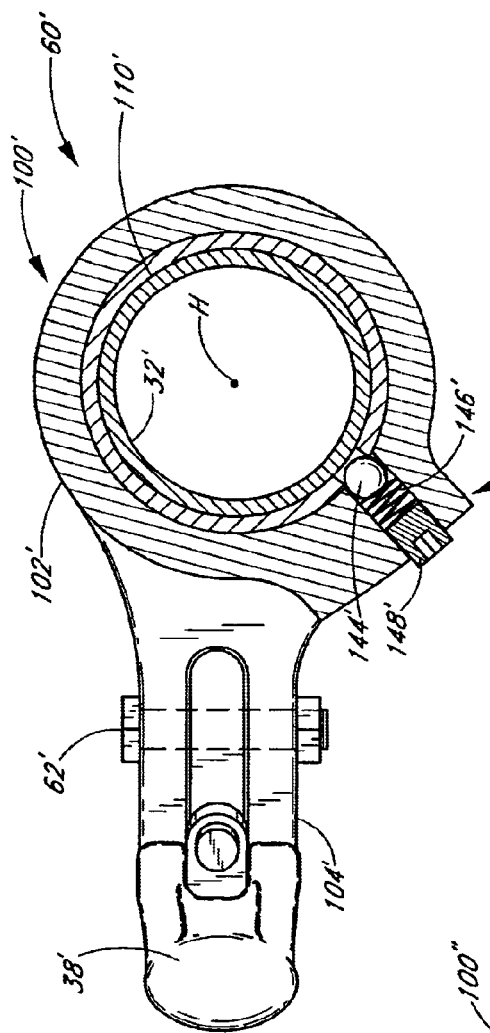
FIG. 7 is a partial cross-sectional view of a modification of the control lever mount of FIG. 4.

FIG. 7 illustrates a modification of the lever mount 60 of FIGS. 3–6 and is referred to generally by the reference numeral 60'. The lever mount 60' of the FIG. 7 operates in a similar manner to the lever mount 60 described above in relation to FIGS. 3–6 and therefore, like reference numerals will be used to describe like components, except that a prime (') will be added.

In the lever mount 60' of FIG. 7, the ball 144' is biased into engagement with the slot 112' of the sleeve 110'. Accordingly, detents (such as detents 142 in FIG. 5) are not necessary. Advantageously, such a construction reduces the manufacturing cost associated with producing the lever mount 60'. Desirably, in such an arrangement, the width of the slot 112' is at least 30% of the diameter of the ball 144'. Preferably, the width of the slot 112' is at least 70% of the diameter of the ball 144' and, most preferably, is about 100% of the diameter of the ball 144'. In addition, the width of the slot 112' preferably is not significantly greater than the diameter of the ball 144'. Desirably, the diameter of the ball 144' is approximately 0.25 inches. Therefore, the width of the slot 112' is preferably at least 0.075 inches, more preferably, at least 0.175 inches and, most preferably, about 0.25 inches. As will be appreciated by one of skill in the art, the figures recited above may vary if a projection member other than a ball 144' is used. That is, if the projection surface is a shape other than spherical.

Figure 8:
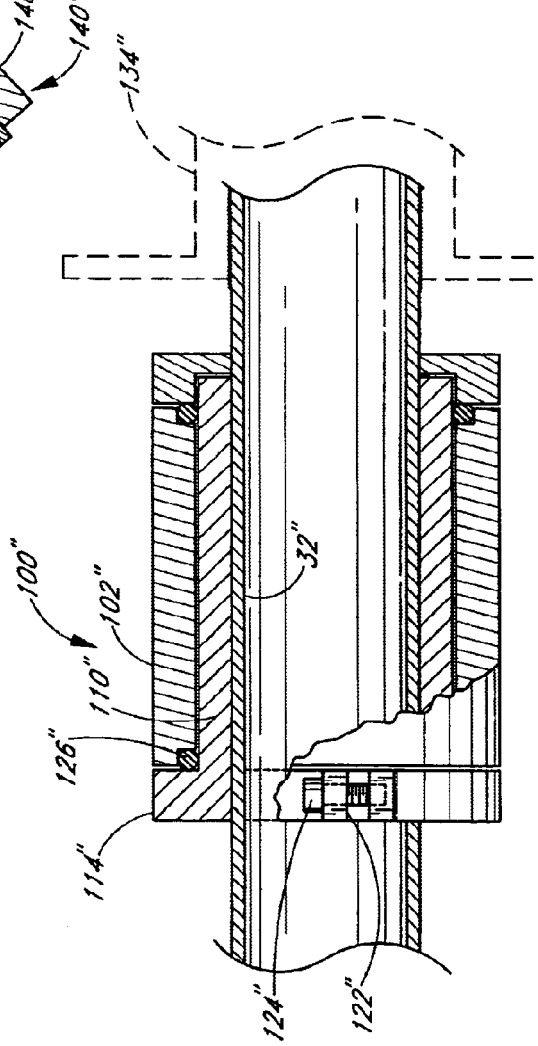
FIG. 8 is a front cross-sectional view of a modification of the control lever mount of FIGS. 3–5.

FIG. 8 illustrates another modification of the lever mount 60 of FIGS. 3–6 and is generally referred to by the reference numeral 60". The lever mount 60" of FIG. 8 operates in a similar manner to the lever mount 60 of FIGS. 3–6 and, therefore, like reference numerals will be used to describe like components except that a double prime (") will be added.

In the lever mount 60" of FIG. 8, the clamp member 114" and a sleeve 110" are formed from a single piece of material. In most other aspects, the mount 60" is substantially similar to the lever mount 60 described above. Advantageously, the arrangement illustrated in FIG. 8 reduces manufacturing costs associated with the lever mount 60" and reduces the number of components necessary while retaining the function of the lever mount 60 described above with reference to FIGS. 3–6.

Although the present invention has been described in terms of certain preferred embodiments, other embodiments apparent to those of ordinary skill in the art are also considered within the scope of this invention. Thus, various changes and modifications may be made without departing from the spirit and scope of the invention. Moreover, not all of the features, aspects and advantages are necessarily required to practice the invention. Accordingly, the present invention is not intended to be limited by the recitation of preferred embodiments, but is intended to be defined solely by reference to the appended claims.

What is claimed is:

1. A control lever mount for mounting a control lever to a handlebar, the handlebar defining a handlebar axis and an outer end portion of the handlebar comprising a control lever mount location and a hand grip portion, said mount comprising:

a sleeve, an internal surface of said sleeve defining a first diameter, said first diameter sized such that said sleeve may be positioned around the handlebar at said mount location, said sleeve comprising a slot, said slot being configured to permit said first diameter to be reduced such that said sleeve may be secured to the handlebar;

at least one clamp portion configured to secure said sleeve to said handlebar;

a body portion having a lever support portion configured to pivotally support a control lever for rotation about a pivot axis, said body portion being supported by said sleeve and being rotatable about said handlebar axis;

a detent arrangement configured to releasably secure said body portion in an angular orientation with respect to said handlebar axis, said detent arrangement permitting said body portion to move from said angular orientation in response to a moment above a predetermined threshold being applied to said body portion;

a first stop and a second stop, said first stop arranged to contact said body portion to prevent movement of said body portion along said handlebar axis beyond said first stop in a first direction and said second stop arranged to contact said body portion to prevent movement of said body portion along said handlebar axis beyond said second stop in a second direction opposite said first direction.

2. The control lever mount of claim 1, wherein said slot extends axially throughout a length of said sleeve.

3. The control lever mount of claim 1, wherein said at least one clamp portion comprises a first clamp portion, said first clamp portion engaging an outer end of said sleeve, further comprising a second clamp portion engaging an inner end of said sleeve.

4. The control lever mount of claim 3, wherein said first clamp portion defines said first stop and said second clamp portion defines said second stop.

5. The control lever mount of claim 3, wherein said first clamp portion and said sleeve are monolithically formed.

6. The control lever mount of claim 1, wherein said at least one clamp portion is integral with said sleeve.

7. The control lever mount of claim 1, wherein said detent arrangement comprises a depression defined by said sleeve and a ball carried by said body portion, said ball being biased into said depression by a biasing member.

8. The control lever mount of claim 7, additionally comprising an adjustment member to adjust a preload on said biasing member thereby adjusting said predetermined threshold for releasing said body portion.

9. The control lever mount of claim 1, wherein said detent arrangement comprises a ball carried by said body portion, said ball being biased into said slot by a biasing member.

10. The control lever mount of claim 9, additionally comprising an adjustment member to adjust a preload on said biasing member thereby adjusting said predetermined threshold for releasing said body portion.

11. The control lever mount of claim 1, wherein said control lever comprises a finger grip portion, an intermediate portion and a biasing member, said biasing member urging said finger grip portion into a normal position of said control lever, said finger grip portion being rotatable relative to said intermediate portion against the biasing force of the biasing member to a deflected position of said control lever.

12. A control lever mount for mounting a control lever to a handlebar, the handlebar defining a handlebar axis and an outer end portion of the handlebar comprising a control lever mount location and a hand grip portion, said mount comprising:

a sleeve, an internal surface of said sleeve defining a first diameter, said first diameter sized such that said sleeve may be positioned around the handlebar at said mount location, said sleeve comprising a slot, said slot being configured to permit said first diameter to be reduced such that said sleeve may be secured to the handlebar;

a first clamp portion and a second clamp portion configured to secure said sleeve to said handlebar, said first clamp portion configured to apply a clamping force to substantially the entire circumference of a first end of said sleeve, said second clamp portion configured to apply a clamping force to substantially the entire circumference of a second end of said sleeve;

a body portion having a lever support portion configured to pivotally support a control lever for rotation about a pivot axis, said body portion being supported by said sleeve and being rotatable about said handlebar axis;

a detent arrangement configured to releasably secure said body portion in an angular orientation with respect to said handlebar axis, said detent arrangement permitting said body portion to move from said angular orientation in response to a moment above a predetermined threshold being applied to said body portion;

at least a first stop portion arranged to contact said body portion to prevent movement of said body portion along said handlebar axis beyond said first stop in a first direction.

13. The control lever mount of claim 12, wherein said slot extends axially throughout a length of said sleeve.

14. The control lever mount of claim 12, additionally comprising a second stop portion, wherein said first clamp portion defines said first stop portion and said second clamp portion defines said second stop portion.

15. The control lever mount of claim 14, wherein said first clamp portion and said sleeve are monolithically formed.

16. The control lever mount of claim 12, wherein said first clamp portion is integral with said sleeve.

17. The control lever mount of claim 12, wherein said detent arrangement comprises a depression defined by said sleeve and a ball carried by said body portion, said ball being biased into said depression by a biasing member.

18. The control lever mount of claim 17, additionally comprising an adjustment member to adjust a preload on said biasing member thereby adjusting said predetermined threshold for releasing said body portion.

19. The control lever mount of claim 12, wherein said detent arrangement comprises a ball carried by said body portion, said ball being biased into said slot by a biasing member.

20. The control lever mount of claim 19, additionally comprising an adjustment member to adjust a preload on said biasing member thereby adjusting said predetermined threshold for releasing said body portion.

21. The control lever mount of claim 12, additionally comprising a second stop portion, said first stop portion being arranged to contact said body portion to prevent movement of said body portion along said handlebar axis beyond said first stop in a first direction and said second stop portion being arranged to contact said body portion to prevent movement of said body portion along said handlebar axis beyond said second stop in a second direction opposite said first direction.

22. The control lever mount of claim 12, wherein said control lever comprises a finger grip portion, an intermediate portion and a biasing member, said biasing member urging said finger grip portion into a normal position of said control lever, said finger grip portion being rotatable relative to said intermediate portion against the biasing force of the biasing member to a deflected position of said control lever.

23. A control lever mount for mounting a control lever to a handlebar, the handlebar defining a handlebar axis and an outer end portion of the handlebar comprising a control lever mount location and a hand grip portion, said mount comprising:

a sleeve, an internal surface of said sleeve defining a first diameter, said first diameter sized such that said sleeve may be positioned around the handlebar at said mount location;

at least one clamp portion configured to secure said sleeve to said handlebar;

a body portion having a lever support portion configured to pivotally support a control lever for rotation about a pivot axis, said body portion being supported by said sleeve and being rotatable about said handlebar axis;

a first stop and a second stop, said first stop arranged to contact said body portion to prevent movement of said body portion along said handlebar axis beyond said first stop in a first direction and said second stop arranged to contact said body portion to prevent movement of said body portion along said handlebar axis beyond said second stop in a second direction opposite said first direction;

wherein said control lever mount comprises a first interference surface and a second interference surface, said first interference surface and said second interference surface being configured to contact one another in a first position to provide a first level of resistance to rotation of said body portion about said handlebar axis, said first interference surface and said second interference surface having a second position providing a second level of resistance to rotation of said body portion, said second level of resistance being less than said first level of resistance.

24. The control lever mount of claim 23, wherein said second level of resistance comprises essentially no resistance.

25. The control lever mount of claim 23, wherein said control lever comprises a finger grip portion, an intermediate portion and a biasing member, said biasing member urging said finger grip portion into a normal position of said control lever, said finger grip portion being rotatable relative to said intermediate portion against the biasing force of the biasing member to a deflected position of said control lever.

26. The control lever mount of claim 23, wherein said sleeve additionally comprises a slot, said slot being configured to permit said first diameter to be reduced such that said sleeve may be secured to the handlebar.

27. The control lever mount of claim 23, wherein said first interference surface and said second interference surface are not in contact with one another in said second position.

* * * * *

UNITED STATES PATENT AND TRADEMARK OFFICE
CERTIFICATE OF CORRECTION

PATENT NO. : 6,892,603 B2
APPLICATION NO. : 10/138933
DATED : January 3, 2006
INVENTOR(S) : Shin Chaki It is certified that error appears in the above-identified patent and that said Letters Patent is hereby corrected as shown below:

Title Page item (73) Assignee: "Renesas Technology Corp., Tokyo (JP)" should read --Mitsubishi Denki Kabushiki Kaisha, Tokyo (JP)--.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 6,892,603 B2 Page 1 of 1
APPLICATION NO. : 10/138933
DATED : May 17, 2005
INVENTOR(S) : Robert L. Barnett It is certified that error appears in the above-identified patent and that said Letters Patent is hereby corrected as shown below:

This certificate supersedes the Certificate of Correction issued June 1, 2010. The certificate should be vacated since no Certificate of Correction was granted for this npatent number.

Signed and Sealed this

Third Day of August, 2010

David J. Kappos
*Director of the United States Patent and Trademark Office*